United States Patent
Ogawa

(10) Patent No.: US 8,376,315 B2
(45) Date of Patent: Feb. 19, 2013

(54) SOLENOID VALVE AND MANUFACTURING METHOD OF THE SAME

(75) Inventor: Hideo Ogawa, Minato-ku (JP)

(73) Assignee: Eagle Industry Co., Ltd., Tokyo (JP)

( * ) Notice: Subject to any disclaimer, the term of this patent is extended or adjusted under 35 U.S.C. 154(b) by 451 days.

(21) Appl. No.: 12/526,851

(22) PCT Filed: Mar. 19, 2008

(86) PCT No.: PCT/JP2008/055077
§ 371 (c)(1),
(2), (4) Date: Aug. 12, 2009

(87) PCT Pub. No.: WO2008/117714
PCT Pub. Date: Oct. 2, 2008

(65) Prior Publication Data
US 2010/0044608 A1 Feb. 25, 2010

(30) Foreign Application Priority Data
Mar. 23, 2007 (JP) ................................. 2007-077905

(51) Int. Cl.
*F16K 31/02* (2006.01)
(52) U.S. Cl. ................................. 251/129.15; 251/368
(58) Field of Classification Search ............. 251/129.15, 251/386
See application file for complete search history.

(56) References Cited

U.S. PATENT DOCUMENTS

| | | | |
|---|---|---|---|
| 5,230,364 A * | 7/1993 | Leng et al. | 137/514 |
| 6,220,275 B1 * | 4/2001 | Nishinosono et al. | 137/238 |
| 6,509,103 B1 * | 1/2003 | Huffer et al. | 428/457 |
| 6,722,627 B2 * | 4/2004 | Murao et al. | 251/129.15 |
| 2003/0116739 A1 | 6/2003 | Murao et al. | |

FOREIGN PATENT DOCUMENTS

| | | |
|---|---|---|
| JP | 09-112733 A | 5/1997 |
| JP | 2003-185051 A | 7/2003 |
| JP | 2003-269647 A | 9/2003 |
| JP | 2004-169751 A | 6/2004 |
| JP | 2004-293763 A | 10/2004 |
| JP | 2005-116640 A | 4/2005 |

* cited by examiner

*Primary Examiner* — John K Fristoe, Jr.
*Assistant Examiner* — Seth Faulb
(74) *Attorney, Agent, or Firm* — Arent Fox LLP

(57) ABSTRACT

Provided is a solenoid valve wherein control characteristics are prevented from deteriorating due to changes of magnetic characteristics of a magnetic circuit when a center post is contaminated, and the desired control characteristics are maintained for a long period of time. In the solenoid valve, a nonmagnetic layer (41) is formed on the surface of a center post (40) by electroless nickel-phosphorous plating or composite electroless nickel-phosphorous plating containing PTFE. Thus, contamination of the center post (40) is remarkably suppressed, the characteristics of the magnetic circuit for moving the plunger (30) by magnetic attraction are prevented from changing due to changes of magnetic permeability between the plunger (30) and the center post (40), the plunger (30) and a valve element (55) integrated with the plunger are suitably moved corresponding to a current applied to a coil (20), and the valve is opened/closed.

6 Claims, 2 Drawing Sheets

SOLENOID VALVE AND MANUFACTURING METHOD OF THE SAME

TECHNICAL FIELD

The present invention relates to a solenoid valve used for automatic torque converter for vehicles and a manufacturing method thereof, particularly, relates to a solenoid valve to perform controlling at an appropriate control property and manufacturing method thereof.

BACKGROUND ART

A solenoid valve has been widely used for controlling flow amount and pressure of fluid. In the solenoid valve, it has been known so-called a linear solenoid valve using a linear solenoid which controls flow amount and pressure of fluid by be in proportion to electric current flowed to a coil, with controlling a magnetic attractive force of a plunger which is controlled by an amount of electric current flowed to the coil.

A structural example of such the conventional solenoid valve is shown in FIG. 2.

A solenoid valve 9 shown in FIG. 2 comprises a coil 20 which generates a magnetic field by electric current, a center post 40b wherein a magnetic circuit is formed by the magnetic field generated by the coil 20, a plunger 30 which is magnetically attracted to the center post 40b, a valve 59 integrally provided with the plunger 30 having a rod 50 and a valve element 55, a valve seat 60 having a through hole 61 contacted with the valve element 55 so as to be opened and closed, a side ring 70 provided so as to enclose a peripheral of the plunger 30, a valve body 80 wherein a bobbin 81 and a cylindrical portion 82 are integrally provided, and a case 90 which is a cylindrical shape having bottom, a spring 10 which defines a position of the plunger 30 by pulling the plunger to a bottom face of the case 90.

Also, the solenoid valve 9 comprises a bearing 11 which supports the plunger 30 and a bearing 12 which supports the rod 50. A first through hole 83 and a second through hole 84 which communicate with an internal portion and an external portion of the valve body 80 respectively are formed at both ends of the valve seat 60 of a cylindrical portion 82 of the valve body 80.

By the constitution, the solenoid valve 9 controls flow amount or pressure of fluid flew outs from an output port 85 by opening and closing the valve element 55 of the valve 59 to the through hole 61 of the valve seat 60 as being the first through hole 83 is an input port for controlled fluid, an edge opening 85 of the cylindrical portion 82 is an output port, the second through hole 84 is a drain port.

In the solenoid valve of this kind, a position of the valve 59 is defined by depending balance of a fluid pressure (e.g., oil pressure) received by the valve 59, an attractive force of which the center post 40b pulls the plunger 30, and a spring force of the spring 10. A pressure control of the controlled fluid which is output from the output port 85 is adjusted by controlling the position of the valve 59. However, when the valve 59 is activated, the controlled fluid such as oil and the like flows into an internal side of the solenoid 95 from a space between the valve 59 and the bearing 12 and a space between the plunger 30 and the bearing 11, there are some cases that an effect is given to a control position of the valve by that a force other than the above mentioned force acts to the valve 59 due to effects of fluctuation of the controlled fluid (oil) and air ratio in the solenoid or a temperature.

Therefore, in the conventional solenoid valve, although it is not shown in FIG. 2, there is a case that fluid and air which are flown into an inside of the solenoid (95) are inlet and outlet by providing a through hole at a bottom face (upper face) of the case (90) so as to activate as a drain port.

Also, for example, a solenoid valve shown in Japanese Patent Publication No. 2005-299919 (Patent Document 1), although it is not shown in FIG. 2, it is suggested that a groove 73 is formed at a contact face side with a bottom face of a case 90 of a flange portion 72 of a side ring 70, an air through hole which communicate with an inner portion 95 of the solenoid valve 95 and an outer portion of the solenoid valve is formed by the groove 73 so that the above mentioned effect is reduced by the air through hole which is as for so called a breathing bore (herein after there is a case called as a breathing bore 73).

In the meantime, some contamination is included in the controlled fluid such as oil and the like, if they are flown into the solenoid valve, there is a case they are adhered to the inside of the solenoid.

In particular, a solenoid valve used for an automatic transmission includes high density of a magnetic contamination in the oil by abrasion of the valve and the like, also, it is necessary to adjust a pressure for a line pressure controlling by activating the solenoid valve continuously, therefore, more large amount of oil which includes contamination flows into or flows out to the solenoid valve. Also, as mentioned above, in the solenoid valve wherein the drain port or the breathing bore 73 are provided at an upper portion of the case, the controlled fluid such as oil and the like flows into the solenoid positively by providing such bore.

Then, the contamination flown into the solenoid adheres in the solenoid due to receiving an effect of a magnetic field formed in the solenoid. In a constitution of the above mentioned solenoid, the contamination easily accumulates particularly at a position between the center post and the plunger which exchanges a magnetic flux, namely at a position where a magnetic attractive forces of the center post and the plunger are acting. Note that, although the contamination adheres to both plunger and the center post which form a magnetic circuit, the contamination hardly adheres to the plunger due to frequently moving thereof, the contamination tends to accumulate easily at the center post since it is not moving.

And if the contamination is accumulated at the position exchanging the magnetic flux of the center post and peripheral position thereof, there is a case to provide an adverse effect to a control property (controlling pressure property) of the solenoid valve, due to changing a magnetic permeability of the magnetic circuit and gap lengths of an axial direction and a radial direction of an attractive portion become ununiformly.

For responding to such problem, for example, a solenoid valve disclosed in a gazette of Japanese Patent No. 3666246 (Patent Document 2), it has been proposed to eliminate adhesion of the contamination by coating nonmagnetic material to a plunger. However, as mentioned above, since magnetic contamination accumulates and build-up mainly at a center post, the above mentioned disadvantageous matter cannot be eliminated sufficiently, even coating the nonmagnetic material at the plunger only. Also, by a constitution wherein the nonmagnetic material is coated at the plunger surface, there is a case that the coating is removed when assembling due to insufficient bonding power of the nonmagnetic material, there is a high possibility to prevent the adhesion of the magnetic contamination to the plunger cannot be prevented. Thus, it has been desired a method for preventing the magnetic contamination more effectively.

Patent Document 1: Gazette of Japanese Patent Laid Open No. 2005-299919

Patent Document 2: Gazette of Japanese Patent No. 3666246

DISCLOSURE OF INVENTION

Technical Problems to be Solved by the Invention

The present invention has been made by considering these problems and a purpose thereof is to provide a solenoid valve which prevents adhesion and accumulation of magnetic contamination between a center post and a plunger, eliminates alteration of a magnetic permeability and maintaining desired control pressure property for long period, and to provide a manufacturing method thereof.

Means for Solving Technical Problems

In order to solve the above mentioned problems, a solenoid valve of the present invention comprises a valve element which opens and closes a fluid channel for controlled fluid, a plunger movably connected integrally with said valve element, a center post which effects magnetic attractive force on said plunger by forming a continuous magnetic circuit through said fluid channel for said controlled fluid between said center post and said plunger, and a magnetic flux generating means which generates magnetic flux so as to form a continuous magnetic circuit between said center post and said plunger, wherein; a nonmagnetic material layer of electroless nickel-phosphorous plating layer is formed on a surface of said center post by means of The solenoid valve having such constitution, because a nonmagnetic layer as electroless nickel-phosphorous plating layer is formed on a surface of said center post, magnetic contamination becomes hardly adhered to the center post, an adverse effect to a control property due to changing a magnetic permeability by accumulating the magnetic contamination. As a result, the solenoid valve available to maintain the desired control characteristics for a long period of time can be provided.

Preferably, the solenoid valve of the present invention wherein a nonmagnetic layer is not formed on a surface of said plunger.

By the solenoid valve having such constitution, an accumulation amount of the contamination to the center post can be reduced as compared from a solenoid valve wherein a nonmagnetic material layer is formed on a surface of a plunger in addition to a surface of a center post, and an effect to a magnetic circuit of the magnetic contamination can be reduced further. At the first glance, it can be considered that it is preferable to form the nonmagnetic material layer on a surface of the plunger which constitutes one part of a magnetic circuit may reduce the adhering amount of the contamination to a space between the center post and the plunger, to maintain the property of the magnetic circuit at a desired condition. However, in actually, by forming the nonmagnetic material layer on the surface of the plunger, a relative attract force of the plunger surface and the center post surface to the contamination closes to a condition when the nonmagnetic material plate layer is not formed on the plunger surface and the center post surface, as a result, the accumulate amount of the contamination to the center post surface increases. On the other hand, if the nonmagnetic material layer is not formed on the plunger surface, although the contamination easily adheres on the plunger surface, there are lots of cases that the contamination adhered to the plunger is removed according to movement of the plunger, and the contamination dose not accumulate on the plunger surface in most cases. Therefore, it is the most preferable to form the nonmagnetic material layer on the center post surface only and not to form the nonmagnetic material layer on the plunger surface, by making this condition, an effect of accumulating of the contamination to the magnetic circuit can be prevented appropriately.

More preferably, the solenoid valve of the present invention wherein said nonmagnetic layer is formed on said center post at least peripheral position where magnetic attractive force acts on said plunger.

By the solenoid valve having such constitution, since the nonmagnetic material layer is formed at a peripheral position where a magnetic attractive force acts to on the plunger of the center post where the contamination adheres and accumulates, a circuit property of the magnetic circuit receives an effect easily by the contamination accumulating, the effect of the accumulation of the contamination to the magnetic circuit can be prevented efficiently.

Preferably, the solenoid valve of the present invention wherein said nonmagnetic layer is composite electroless nickel-phosphorous plating layer containing PTFE (polytetrafluoroethylene (tetra fluoride) resin).

By the solenoid valve having such constitution, the nonmagnetic layer is formed at a surface of the center pose by composite electroless nickel-phosphorous plating layer containing PTFE. PTFE has properties such as low friction, oil-repellency, good slippage and the like. Therefore, by plating which includes PTFE, due to function of PTFE and flowing of the controlled fluid by the movement of the plunger, the contamination adhered to the position, where an attractive force between the center post and plunger acts, becomes easily removable, further effect can be obtained at a point to prevent the contamination adhering and accumulating.

Also, preferably, the solenoid valve of the present invention wherein said composite electroless nickel-phosphorous plating layer contains 20 to 26 volume % of PTFE (polytetrafluoroethylene (tetra fluoride) resin).

By the solenoid valve having such constitution, because a plating layer wherein PTFE is included at appropriate amount, the contamination adhered to the center post becomes further removably, more further effect can be obtained at a point to prevent the contamination adhering and accumulating.

Also preferably, the solenoid valve of the present invention, said nonmagnetic layer is less than 10 μm of layer thickness.

By the solenoid valve having such constitution, the nonmagnetic layer is less than 10 μm of layer thickness. Strength of a magnetic field formed on the center post in the solenoid valve becomes weak rapidly when moves from the center post surface. Namely, by making a position where the contamination exists away from the center post surface, the attractive force acts on the contamination decreases significantly. Therefore, the layer thickness of the nonmagnetic material layer formed on the center post may be thin sufficiently. Specifically, an effect can be exerted if a level of a substrate surface is not exposed, actually, it is preferable that a level of few μm, more specifically, a thickness of 4 μm and the like.

Note that, a similar effect can be obtained, even if the thickness of the nonmagnetic material layer formed on the center post surface is thicker with respect to the above. However, when the nonmagnetic material layer becomes thicker, a new problem occurs that a layer thickness (membrane thickness) becomes ununiformly, and it is not preferable for reducing cost and for increasing. Therefore, by making the thickness layer of the nonmagnetic material layer is less than 10 μm as the present invention, a solenoid valve having good balance at all subjects such as functional effect of adhering prevention, uniformity of the layer thickness, reduction of the cost and increasing productivity, high effect, inexpensive and high performance can be provided.

Also, a manufacturing method for a solenoid valve of the present invention comprises steps of forming a valve element which opens and closes a fluid channel for controlled fluid, forming a plunger movably connected integrally with said valve element, forming a center post which effects magnetic attractive force on said plunger by forming a continuous magnetic circuit through said fluid channel for said controlled fluid between said plunger, and forming a magnetic flux generating means which generates magnetic flux so as to form a continuous magnetic circuit between said center post and said plunger, wherein a nonmagnetic material layer of plating layer is formed on a surface of said center post by means of electroless nickel-phosphorous plating, and heat treatment generating magnetic property on the plating layer is not performed after said plating.

By the manufacturing method of the solenoid valve such as the present invention, since the heat treatment generating magnetic property is not performed after plating, it can be provided the manufacturing method for a solenoid valve wherein a plate layer as the nonmagnetic material layer is appropriately formed on the center post surface.

Preferably, the manufacturing method for the solenoid valve such as the present application wherein after said plating, heat treatment on the plating layer higher than 300° C. is not performed.

By the manufacturing method of the solenoid valve such as the present invention, since the heat treatment to cause said plating layer does not become higher than 300° C. is not performed, the plate layer of the center post surface taking magnetic can be prevented, it can be provided the manufacturing method for a solenoid valve wherein a plate layer as the nonmagnetic material layer is appropriately formed on the center post surface.

THE PREFERRED EMBODIMENTS OF THE INVENTION

Figure 1:
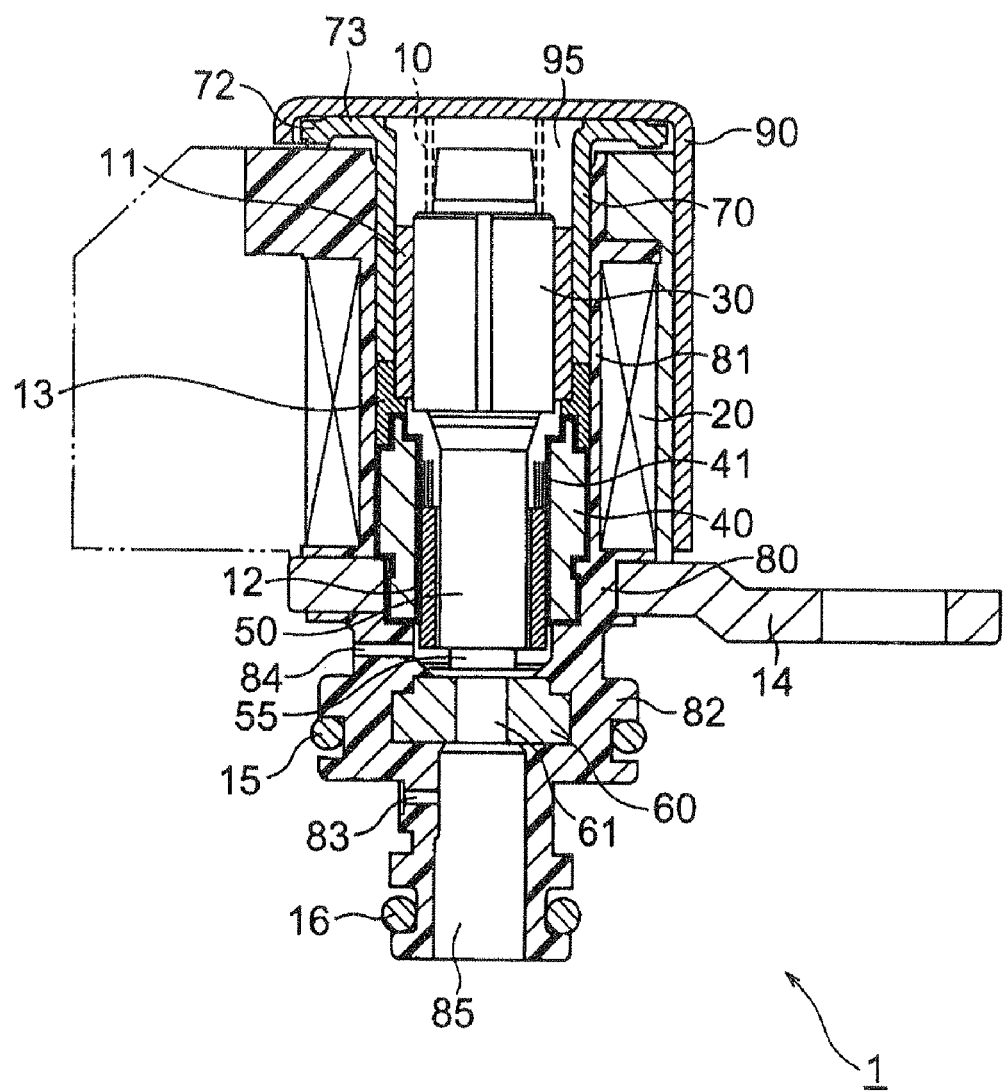
FIG. 1 is a schematic cross sectional view showing a solenoid valve of one embodiment of the present invention.

With respect to a solenoid valve of one embodiment of the present invention will be specified with reference to FIG. 1.

A solenoid valve of the present embodiment is a linear solenoid valve to control a flow amount and a pressure of fluid which flow outs from an output port by adjusting an amount of electric current flowed to a coil.

FIG. 1 is a schematic cross sectional view showing a constitution of the solenoid valve 1.

As shown in FIG. 1, the solenoid valve 1 comprises a coil 20, a plunger 30, a center post 40, a rod 50, a valve element 55, a valve seat 60, a side ring 70, a valve body 80 and a case 90.

The coil 20 generates a magnetic field with a desired strength and a desired direction by controlling electricity applied from a control circuit which is not shown. By the magnetic field, as mentioned below, the plunger 30 is moved, and a position of the valve element 55 which is constituted integrally with the plunger 30, is controlled so that the valve opens and closes as a desired condition.

The plunger 30 is a member which is constituted as integrally movable with the rod 50 and the valve element 55, and is accommodated in the side ring 70. The plunger 30 is arranged so as to be pulled to a bottom face (upper face) direction of the case 90 by a spring 10, when a magnetic attractive force originated from the magnetic field generated by the coil 20 does not act between the center post, the plunger 30 is arranged at a predetermined position in the bottom face (upper face) side of the case 90. Then, when the magnetic attractive force is acted between the center post 40 by flowing electric current to the coil 20, the plunger 30 is absorbed by the center post 40 with resisting a spring force of the spring 10, and the plunger 30 is moved to a position where is corresponding to the magnetic attractive force thereof.

Note that, the nonmagnetic material layer is not formed on a surface of the plunger 30.

The center post 40 is a member which is fixed to an inner circumferential of the valve body 80 which is formed by magnetic material, and forms a magnetic circuit so as to act an attractive force in response to the strength of the magnetic force to the plunger 30.

In the present embodiment, an electroless nickel-phosphorous plating layer is applied on a surface of the center post 40, thereby, a nonmagnetic material thin film (nonmagnetic material layer) 41 is formed on its surface.

The nonmagnetic material layer 41 is formed at least on a peripheral position as being a pathway of a magnetic field connected with the plunger so as to acts the magnetic attractive force to the plunger. Other than this area, it is arbitral to form the nonmagnetic material layer 41 at which area of the surface of the center post 40. For example, a constitution may be formed at whole area of a face to which the controlled fluid enters into an inside of the solenoid 95 (space area of plunger side 30 with respect to the valve seat 60 in the valve body 80). Also, a constitution may be formed at whole circumferential surface of the center post 40. In the present embodiment, it is formed at whole circumferential surface of the center post 40.

Also, the nonmagnetic material layer 41 may be for example 10 μm maximum and the like so as not to expose the surface of the center post 40, more preferably 4 μm.

Note that, this nonmagnetic material layer 41 is formed by electroless nickel-phosphorous plating at the time of manufacturing the center post 40, when plating is performed and in the manufacturing process after forming the nonmagnetic plating layer, heat treatment to cause the nonmagnetic material layer 41 which becomes higher than 300° C. is not performed at all. If the heat treatment which becomes a temperature higher than 300° C. is performed, there is a high possibility that the plating layer takes magnetic and the nonmagnetic material layer cannot be formed. Note that, in the electroless nickel-phosphorous plating, a content rate of phosphorous is 2 to 15%, more preferably 8 to 10%.

The rod 50 is a rod-like element which connects the plunger 30 and the valve element 55 and moves integrally with the plunger 30 and the valve element 55 according to movement of the plunger 30.

The valve element 55 is provided at an edge of the rod 50 and moves integrally with the plunger 30 and the rod 50 according to moving of the plunger 30. And the valve element 55 closes the valve by seating, and opens the valve by spacing in response to a spacing status thereof. The valve element 55 may be formed integrally with the rod, or may be a constitution attached to a tip end of the rod 50 as another component.

The valve seat 60 is a member that a through hole 61 is provided at a center portion, and is provided to the valve body 80 so as to contact the valve element 55 to the through hole 61. When the valve element 55 is seated to the valve seat 60 by the plunger 30 moving, the through hole 61 of the valve seat 60 is closed, and thus the valve becomes closing status. Also, when the valve element 55 is spaced from the valve seat 60 according to moving of the plunger 30, the through hole 61 is opened and the valve becomes opening status with in response to the spaced status.

The side ring 70 is a cylindrical member provided as surrounding the circumference of the plunger 30, and to form one part of the magnetic circuit formed by a magnetic field from the coil 20. One end portion of the side ring 70 is formed as a flange portion 72, the side ring 70 is arranged on a case 90 so that the flange portion 72 is contacted with a bottom face of the case 90.

Grooves 73 are radially formed on the contact face of the flange portion 72 and the bottom face of the case to connect an internal side and an external side of the side ring 70. The grooves 73 are formed as equally spaced at some position of whole circumference of the flange portion, for example, 4 positions or 8 positions and the like. By the grooves 73, a through hole (there is a case called as a breathing hole 73) which communicates with an internal portion and an external portion of the solenoid is formed. The breathing hole 73 acts as a drain port to discharge the controlled fluid flown into the solenoid 95, or acts as an opening to supply air to the inside of the solenoid and to exhaust air.

A valve body 80 is a member that a bobbin 81 and a cylindrical portion 82 are integrally formed. A coil 20 is arranged at a circumferential of the bobbin 81, a center post 40, a side ring 70 and the like are equipped to an inner circumferential face thereof, and a moving body which is composed of a plunger 30, a rod 50 and a valve element 55, is received at further internal side thereof.

The cylindrical portion 82 is a cylindrical member so that the controlled fluid passes through an inside thereof. The valve seat 60 is arranged at the bobbin side 81 of the cylindrical portion 82. Then, at both sides of the valve seat 60 of the cylindrical portion 82, a first through hole 83 and a second through hole 84 are formed which communicate the inner portion and the external portion of the cylindrical portion respectively. Namely, the first through hole 83 communicates through the inner portion and the outer portion of the cylindrical portion 82 at an tip end side of the valve seat 60 of the cylindrical portion 82, the second through hole 83 communicates through the inner portion and the outer portion of the cylindrical portion 82 at the bobbin 81 side of the valve seat 60 of the cylindrical portion 82.

Therefore, in a status that the valve element 55 is closed by the through hole 61 of the valve seat 60 which seating at the valve seat 60 the by moving as stated above, the first through hole 83 side and the second through hole 84 side of the cylindrical portion 82 of the valve body 80 are isolated, and a valve becomes closed status. Also, the valve element 55 is spaced away from the valve seat 60 according to moving the plunger 30, the through hole 61 is opened, the first through hole 83 side and the second through hole 84 side of the cylindrical portion 82 of the valve body 80 become communication status, and the valve becomes opening status.

A case 90 is a cylindrical member having a shape that one end face (an upper face in FIG. 1) is closed as a bottom face so as to receive the coil 20, the valve body 80 and the like internally.

The solenoid valve 1 further comprises a spring 10, bearings 11 and 12, a spacer 13, a bracket 14 and seal rings 15 and 16.

The bearing 11 movably supports the plunger 30, the bearing 12 movably supports the rod 50 towards the axial direction of the solenoid valve 1 respectively.

A spacer 13 is formed by magnetic material and is a member arranged between the center post 40 and the side ring 70 shown in drawings and having a cross sectional view shown in the drawings. A spacer 13 prevents to form a magnetic circuit which connects between the center post 40 and the side ring 70 directly, arranged between the center post and the side 70 ring so as to form a magnetic circuit via the plunger 30 originated by a magnetic field occurs at the coil 20.

A bracket 14 constitutes one part of the magnetic circuit and is a member to mount the solenoid valve 1 at a desired position.

Seal rings 15 and 16 are O-rings equipped at a predetermined position of a circumferential of the valve body 80 so as to prevent leakage of the controlled fluid from a predetermined flow channel.

In the solenoid valve 1 having such constitution, the plunger 30, the center post 40, the bracket 14, the case 90 and the side ring 70 are constituted by magnetic materials, respectively. And when the electric current is flowed to the coil 20, a magnetic field in a direction of the above mentioned sequence or opposite direction thereof is made by a magnetic field generated by the coil 20.

As a result, a magnetic force acts between the center post 40 and the plunger 30, the plunger 30 is attracted to a direction of the center post 40, and is moved to a position in response to a magnetic attractive force acting. According to this, the valve element 55 is arranged to a predetermined position against the through hole 61 of the valve seat 60, the valve becomes opening and closing status in response to a position of the valve element 55.

Therefore, in the solenoid valve 1, by controlling current value applied to the coil 20, a position of the valve element 55 to the through hole 61 of the valve seat 60 is controlled, the opening and closing status of the valve can be controlled as a desired condition.

Movement of such solenoid valve 1 will be explained, specifically.

Here, the first through hole 83 which is formed at an tip end side with respect to the valve seat 60 of the cylindrical body 82 of the valve body 80, is as an input port, an opening 85 at further tip end of the cylindrical portion 82 is as an output port, a flow amount of fluid flown out from the port 85 or a pressure of the fluid is controlled. In this case, the second through hole 84 which is provided at an inner side with respect to the valve seat 60 of the cylindrical portion 82 of the valve body 80 and the breathing hole 73 provided between the flange portion 72 of the side ring 70 and the case 90 act as drain ports for discharging fluid which does not contribute to the control.

At first, in a status of the coil 20 is not electrified, the plunger 30 is maintained at a position spaced from the center post 40 by a spring force of the spring 10, the valve element 55 is in a position away from the valve seat 60. In this case, since the valve is in a status of completely opening, fluid which is flown from the first through hole 83 (an input port) flows to the output port 85 of the cylindrical portion 82 and is discharged from the second through hole 84 as a drain port through the through hole 61 of the valve seat 60. Also, one part of the fluid flows to a bottom face direction of the case 90 through between the center post 40, the rod 5 and the plunger 30, and flows through between plunger 30 and the side ring 70, and is discharged from the breathing hole 73.

In this status, a flow amount (controlled flow amount) of fluid flown outs from the output port 85 is comparatively small, and a pressure of the fluid (controlled pressure) flown outs from the output port 85 is also comparatively low.

When the coil 20 is electrified, a magnetic circuit is made at the plunger 30, the center post 40, the bracket 14, the case 90 and the side ring 70 by a magnetic field generated at the coil 20. Then, a magnetic attractive force acts between the plunger 30 and the center post 40 thereby, the plunger 30 is attracted to a direction of the center post 40 against the spring force of the spring 10. Namely, the plunger 30, the rod 50 and the valve element 55 integrated thereof move to a direction of the valve seat 60.

In this case, when a current flows to the coil 20 is comparatively low, although the plunger 30 moves to a direction of the center post 40, the vale element 55 does not reach contacting with the valve seat 60, the valve element 55 becomes a status that maintained at a neighbor of the through hole 61 of the valve seat 60. This status is that the valve opens slightly, the fluid flown from the input ort (first though hole) 83 flow to the output port 85 as well as discharged from the second through hole 84 through an interspace in a opening status between the through hole 61 of the valve seat 60 and the valve element 55. Also, as similar with when the valve opens completely, one part thereof flows to the bottom face direction of the case 90 passes though between the center post 40, the rod 50 and plunger 30 as well as between the plunger 30 and the side ring 70, and is discharged from the breathing hole 73.

In this status, as compared from a status that the coil 20 is not electrified, a flow amount (controlled flow amount) of fluid flow outs from the output port becomes larger, and a pressure of the fluid (controlled pressure) flown outs from the output port becomes higher.

Then, when electric current through the coil 20 becomes a value which is more than a certain amount, the plunger 30 is attracted to the center post 40 sufficiently, the valve element 55 moves to a position where contact with the valve seat 60. Namely, the valve element 55 is seated to the through hole 61 portion of the valve seat 60. In this status, the valve is completely closed status, the fluid which is flown from the input port (first through hole) 83 flows to the output port 85 at all. Thus, a flow amount of the fluid flows outs from the output port 85 becomes equal to a flow amount of the fluid flows from the input port 83 (the controlled flow amount), a pressure of the fluid flow outs from the output port (the controlled pressure) becomes equal to a pressure (basic pressure) of fluid flows from the input port 83. Namely, in case that the flow amount and the basic pressure of the input fluid is constant, the controlled flow amount and the controlled pressure becomes maximum status.

In the solenoid valve 1 like this according to the present embodiment, a magnetic attractive force of the plunger 30 to the center post 40 can be controlled linearly by controlling an amount of electric current flowed to the coil 20. As a result, the plunger 30 moves to a position where the pressure of the fluid flows from the input port 83, the magnetic attractive force to the center post 40 direction and the spring force of the spring 10 are well-balanced, and is maintained at this position. Therefore, a moving distance of the plunger 30 is controlled by adjusting the amount of electric current flowed to the coil 20, namely a position is controlled, thereby the flow amount flows to the output port 85 (controlled flow amount) and the pressure (controlled pressure) may be controlled.

Figure 2:
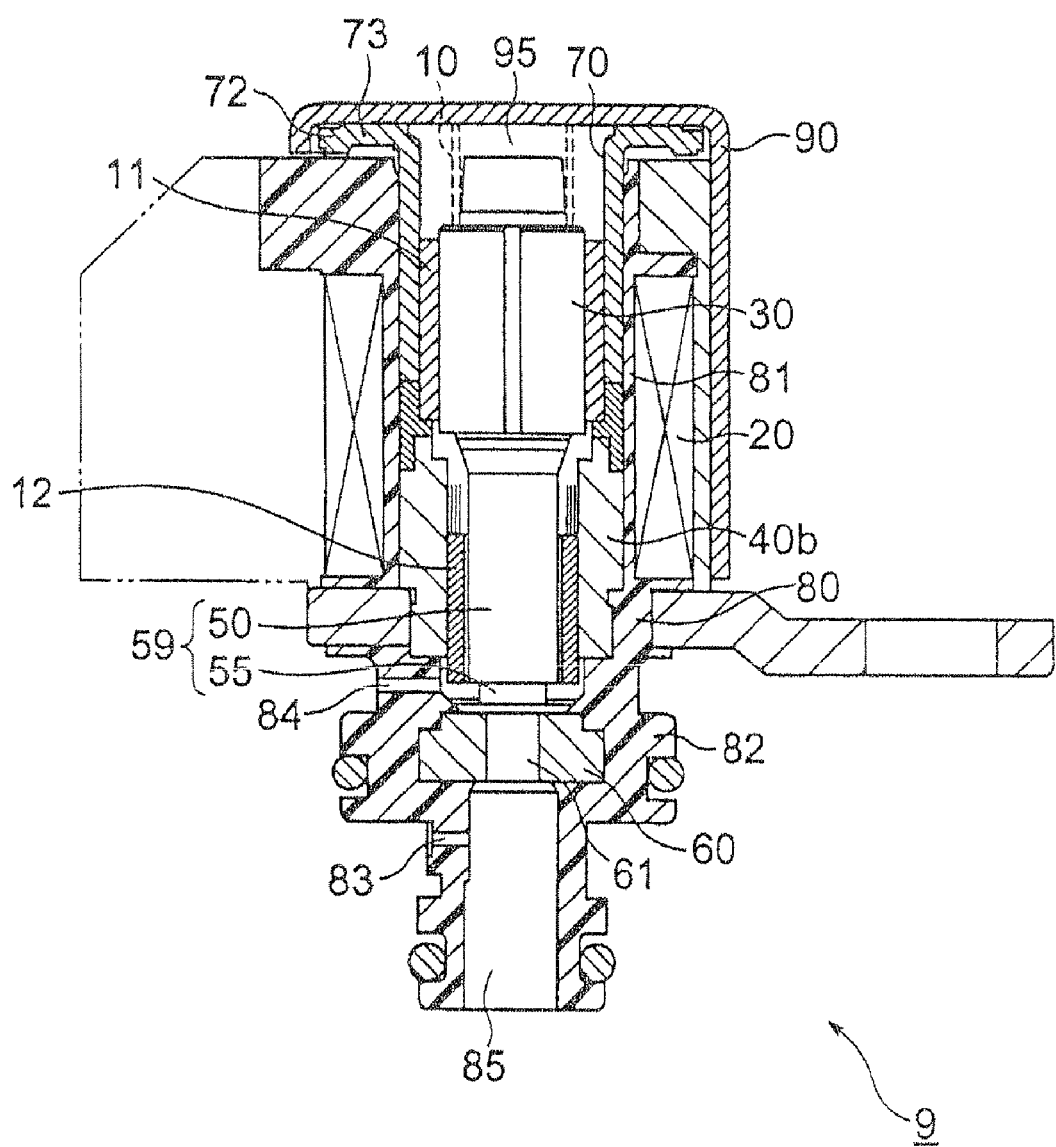
FIG. 2 is a schematic cross sectional view showing a conventional solenoid valve.

Then, in the solenoid valve 1 according to the present embodiment particularly, a nonmagnetic material layer having a thickness of few μm by electroless nickel-phosphorous plating is formed on a surface of the center post 40. As mentioned above, the one part of the fluid which does not contribute to the controlling flows through between the center post 40, the rod 50 and the plunger 30 and flows into the bottom face direction of the case 90, and the one part of the fluid is discharged from the breathing hole 73. Thus, in the conventional solenoid valve 9 (refer to FIG. 2), the contamination adheres to a portion at this time wherein an attractive force of a surface of a center post 40b acts, particularly to the plunger 30, an adverse effect has been provided to controlling properties (control pressure property) of the solenoid valve 9.

However, in the solenoid valve 1 of the present embodiment, since the nonmagnetic material layer by the electroless nickel-phosphorous plating is formed on a surface of the center post 40, an attractive force of the center post 40 to the contamination can be lowered. As a result, it becomes hard to adhere the magnetic contamination on the surface of the center post 40, receiving the adverse effect of the controlling property (control pressure property) of the solenoid valve 1 by the magnetic contamination adhesion can be prevented.

Also, in the solenoid valve 1 of the present embodiment, it is constituted purposely that the nonmagnetic material layer is not formed on the surface of the plunger 30. By making this constitution like this, relative magnitudes of the attractive force of the surface of the center post 40 to the contamination and the attractive force of the surface of the plunger 30 to the contamination are that the attractive force of the surface of the center post 40 to the contamination becomes weak as comparing from a case that the nonmagnetic material layer is formed on both surfaces of the plunger 30 and the center post 40, and the nonmagnetic material layer is not formed on both surfaces. From this action, in the solenoid valve 1 of the present invention, an amount of the contamination adheres, accumulates and build-up at the surface of the center post 40 can be reduced, the adverse effect receiving of the controlling property (control pressure property) of the solenoid valve 1 by the magnetic contamination adhesion can be prevented.

Note that, by making such the constitution, the attractive force of the surface of the plunger 30 to the contamination becomes relatively larger, and there is a possibility to increase number of contamination adhered to the surface of the plunger 30. However, since the plunger 30 moves continuously, the contamination adhered to the surface of the plunger 30 removes immediately in response to movement of the plunger 30, it will not be at least a status to accumulate the contamination on the surface of the plunger 30. Then, the contamination adhered contemporarily on the surface of the plunger 30 does not provide any specific large effects to the magnetic circuit property.

Also, in the solenoid valve 1 of the present embodiment, it is constituted that the spacer 13 is arranged as closely contacted with the center post 40 (not inserted pressingly), when assembling, the center post 40 and the spacer 13 are rubbed each other. At this time, a layer formed on the surface of the center post 40 is when it is a film formed by coating, there was a possibility to peel by rubbing with spacer 13. In case that the film of the surface of the center post 40 is peeled, a surface of the center post 40 is exposed which is not preferable since the magnetic contamination adheres thereto.

Contrary to the above, in the solenoid valve 1 of the present embodiment, the nonmagnetic material layer is formed on the whole surface of the center post by plating whose bonding force is greater than the coating. Therefore, even if rubbing with the spacer 13, a possibility of peeling the nonmagnetic material layer becomes very low. In the solenoid valve 1 of the present embodiment at this point, adhesion of the magnetic contamination to the surface of the center post 40 can be prevented appropriately, and deterioration of the controlling property (control pressure property) of the solenoid valve 1 can be prevented appropriately.

Also, there is one of technical feature that electroless nickel-phosphorous plating may uniform a thickness of layer (film thickness) extremely. Thus, according to forming the nonmagnetic material layer by electroless nickel phosphorous plating, a layer (film) of uniform thickness can be formed, there are no cases that, for example, occurrence of an interspace between other contact components, such as the center post 40 and the space and the like, enlarging the interspace, by ununiform of the layer thickness. As a result, a possibility of influence to the control by infiltration and accumulation of the contamination to the interspace can be reduced.

Also, in the solenoid valve 1 of the present embodiment, the nonmagnetic material layer is formed as a thickness less than 10 μm, namely a specific preferable example is 4 μm thickness. When the thickness of the nonmagnetic material layer is more, the influence of magnetic field becomes lower and an attractive force which acts on the contamination becomes lower too. However, if a magnetic field at a position where the most strong magnitude in the surface of the center post 40 (the highest magnetic flux density) to attract the plunger 30, this strength becomes weak rapidly when it is away from the attracting portion even slightly spaced. Similarly, with respect to other surfaces of the center post 40, the strength of the magnetic field becomes weak considerably. Then, the attractive force acts on the magnetic contamination becomes weak due to the strength of the magnetic field becomes weak. Namely, the attractive force acts on the magnetic contamination becomes weak extremely even if it is slightly away from the surface of the center post 40. Therefore, the thickness formed on the surface of the center post 40 may be, as a maximum 10 μm and the like that is a level that a substrate surface is covered, its functions and effects can be exerted if such the level of the thickness exists.

Contrary to the above, if the thickness of layer (film thickness) becomes thinner, problems such as uniformity of the thickness of layer becomes harder, a cost becomes higher, its productivity becomes lowered and the like will be occurred. Therefore, it is extremely adequate to form the nonmagnetic material layer whose layer thickness is less than 10 μm upon considering its function, cost, productivity and the like overall, and the layer thickness is extremely effective upon working the present invention.

Also, the solenoid valve 1 of the such constitution, since the contamination adhering amount to the center post 40 by various factor as mentioned above can be reduced extremely, a durability of the solenoid valve 1 can be enhanced.

Further, since this constitution according to the present invention has been made so as to obtain the above mentioned distinctive functions and effects without changing a structure of the solenoid valve 1 and without providing effects to the magnetic flux formed between the plunger 30 and the center post 40 which is extremely effective.

Note that, the above mentioned embodiments specified are for easily understanding of the present invention, and does not limit the present invention at all. Each element disclosed in the present embodiment includes all design around and equivalents involved in a technical scope of the present invention, also arbitral and preferable various modifications are available.

For example, the forming of the nonmagnetic material layer to the center post 40 or the above mentioned plunger 30 may be made by applying composite electroless nickel-phosphorous plating layer containing PTFE (polytetrafluoroethylene (tetra fluoride) resin). PTFE has properties such as low friction, oil-repellency, good slippage and the like. Therefore, by including PTFE in a plating layer which is formed on the surface of the center post, an effect of the contamination adhered to the attractive portion of the center post 40 and the plunger 30 becomes easily removable, is occurred. As a result, adhesion of the contamination to the surface of the center post 40 can be reduced further, a possibility of receiving an adverse effect to the control property (controlled pressure property) of the solenoid valve 1 can be reduced further.

Note that, it is preferable that content of the PTFE is 20 to 26 volume %.

Also, in the present embodiment, although the present invention is explained by exemplifying a normal open type solenoid valve, the present invention can be applied to a normal close type solenoid valve and similar effects can be obtained.

INDUSTRIAL APPLICABILITY

A solenoid valve and manufacturing method thereof can be used to a pulley pressure control, a line pressure control, a clutch pressure control and the like, as a more specific example, it is preferably used for a clutch hydraulic pressure control for an automatic torque converter for vehicles.

The invention claimed is:

1. A solenoid valve comprising:
   a valve element which opens and closes a fluid channel for controlled fluid, a plunger movably connected integrally with said valve element,
   a center post which effects magnetic attractive force on said plunger by forming a continuous magnetic circuit through said fluid channel for said controlled fluid between said
center post and said plunger, and
   a magnetic flux generating means which generates magnetic flux so as to form a continuous magnetic circuit between said center post and said plunger, wherein:
   a nonmagnetic material layer of electroless nickel-phosphorous plating layer is formed on a surface of said center post,
      said nonmagnetic material layer is formed at least on a peripheral position of said center post where said magnetic attractive force acts on said plunger, and
      said nonmagnetic material layer is not formed on a surface of said plunger.

2. The solenoid valve as set forth in claim 1 wherein a thickness of said nonmagnetic layer is less than 10 μm.

3. The solenoid valve as set forth in claim 1, wherein said nonmagnetic material layer is a composite electroless nickel-phosphorous plating layer containing PTFE (polytetrafluoroethylene (tetra fluoride) resin).

4. The solenoid valve as set forth in claim 3, wherein said composite electroless nickel-phosphorous plating layer contains 20 to 26 volume % of PTFE (polytetrafluoroethylene (tetra fluoride) resin).

5. A method for manufacturing a solenoid valve, comprising steps of:
   forming a valve element which opens and closes a fluid channel for controlled fluid,
   forming a plunger movably connected integrally with said valve element,
   forming a center post which effects magnetic attractive force on said plunger by forming a continuous magnetic circuit through said fluid channel for said controlled fluid between said center post and said plunger, and
   forming a magnetic flux generating means which generates magnetic flux so as to form a continuous magnetic circuit between said center post and said plunger, wherein;
   a nonmagnetic material layer of plating layer is formed on a surface of said center post and at least on a peripheral position of said center post where said magnetic attractive force acts on said plunger by means of electroless nickel-phosphorous plating, and heat treatment generating magnetic property on the plating layer is not performed after said plating,
   said nonmagnetic layer is not formed on a surface of said plunder.

6. The method accordingly to claim 5, wherein after said plating, heat treatment on the plating layer higher than 300° C. is not performed.

* * * * *